Feb. 23, 1926. 1,573,865
C. W. ROBBINS
METHOD OF AND APPARATUS FOR TESTING THE ELASTIC PROPERTIES OF METALS
Filed June 12, 1920 2 Sheets-Sheet 1
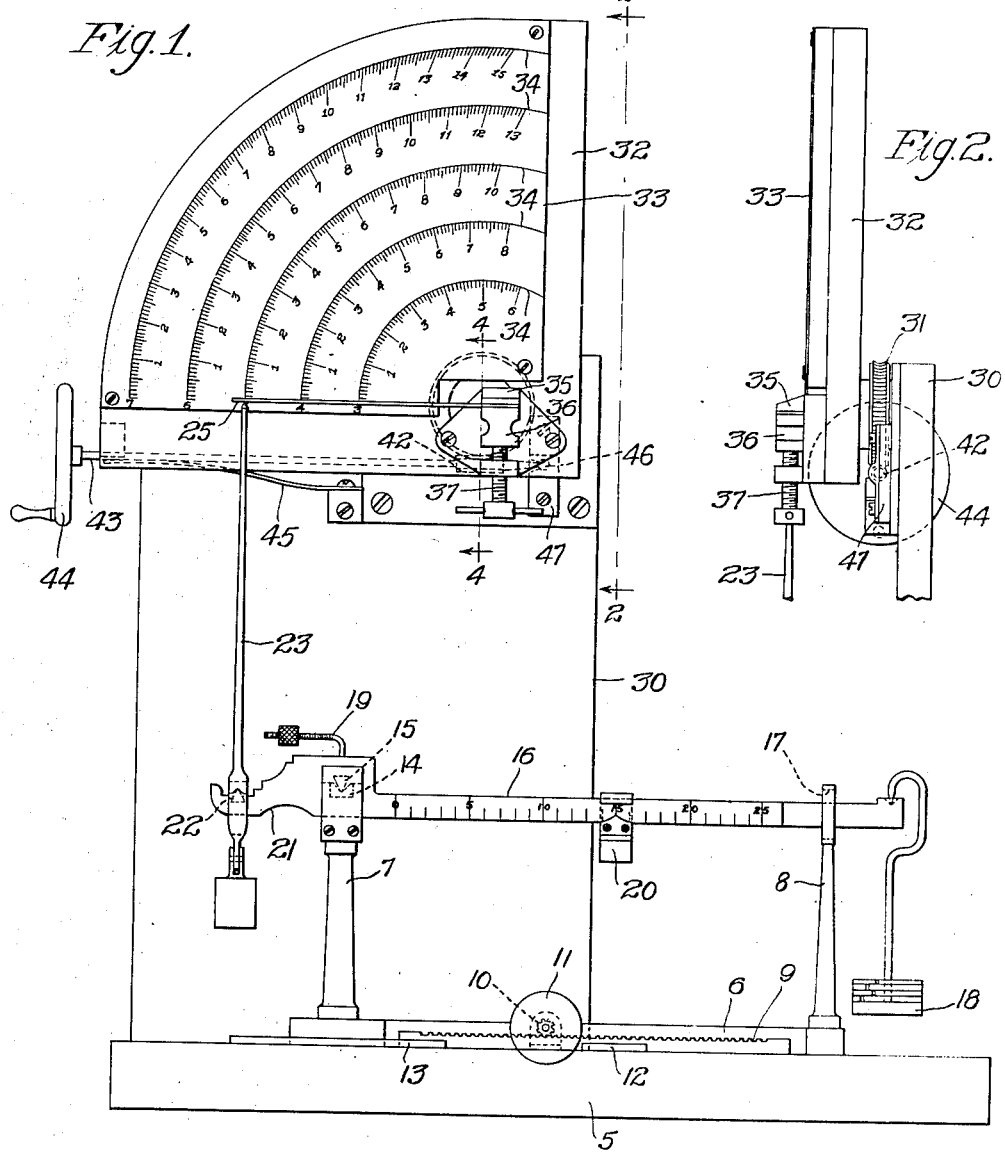
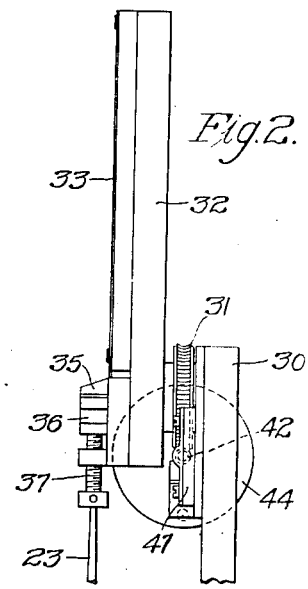
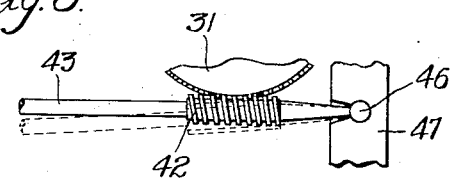
Inventor
Charles W. Robbins
by G. W. Campbell
Atty.

Feb. 23, 1926.
C. W. ROBBINS
1,573,865
METHOD OF AND APPARATUS FOR TESTING THE ELASTIC PROPERTIES OF METALS
Filed June 12, 1920    2 Sheets-Sheet 2
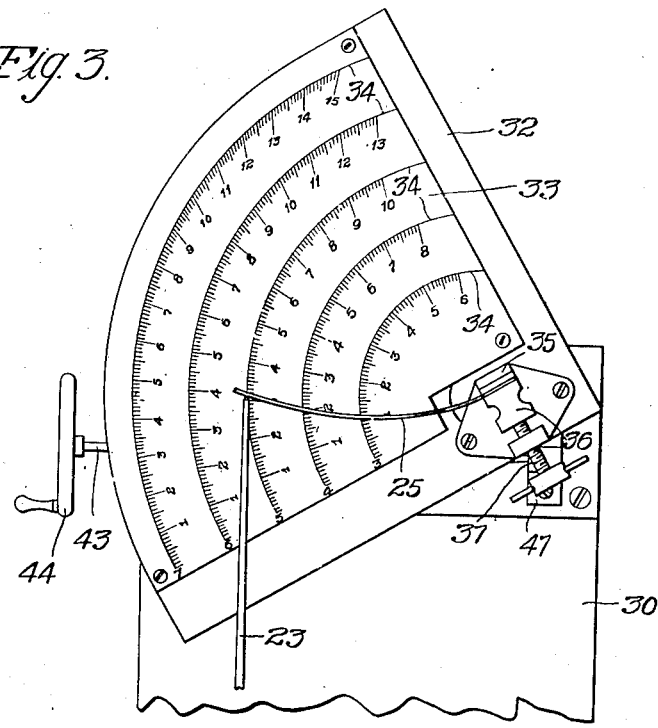
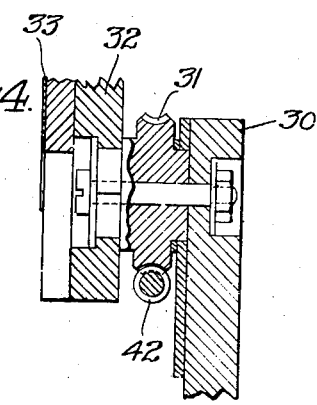
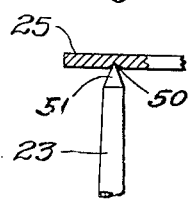
Inventor
Charles W. Robbins
by J.M.Campbell
Atty.

Patented Feb. 23, 1926.

1,573,865

UNITED STATES PATENT OFFICE.

CHARLES W. ROBBINS, OF LAGRANGE, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR TESTING THE ELASTIC PROPERTIES OF METALS.

Application filed June 12, 1920. Serial No. 388,454.

*To all whom it may concern:*

Be it known that I, CHARLES W. ROBBINS, a citizen of the United States, residing at LaGrange, in the county of Cook and State of Illinois, have invented certain new and useful Improvements in a Method of and Apparatus for Testing the Elastic Properties of Metals, of which the following is a full, clear, concise, and exact description.

This invention relates to a method of and apparatus for testing the elastic properties of metals.

It is one of the objects of this invention to provide a simple and accurate method for determining commercially the elastic properties of materials, and particularly of metals which may be used as contact springs and for like purposes in electrical apparatus.

In accordance with the general features of this invention, a method which may be employed with good results for testing the elastic properties of materials consists in deflecting a strip of the material of uniform cross section and given length out of a normal or zero plane with pressures of gradually increasing amounts, noting the deflection and permanent set for each pressure and continuing the readings beyond the point where the sample first shows a permanent set. From the data thus obtained the results may be tabulated or curves drawn showing the modulus of elasticity, elongation under stress, and permanent elongation for the several amounts of stress applied.

The invention has as another object the provision of a simple and convenient form of apparatus for applying the pressure and taking the readings necessary for the determinations in the practice of the above method. The apparatus of this invention consists in general of a clamping means for holding one end of a sample strip to be tested, and a pressure applying means adapted to engage the free end of the strip, together with a suitable scale for measuring deflections, and a means for determining the amount of pressure applied. A convenient form for the apparatus is one in which a quadrant rotatable with the clamping means is divided into suitable scales for reading directly the deflection of the strip under pressure, and a pressure applying means connected directly with a balance beam scale which is weighted to balance after each predetermined movement of the rotatable quadrant.

Other features of the invention relate to the details of construction of the apparatus for adjusting the balance beam scale longitudinally to take care of the various lengths of test samples.

In the drawings illustrating this invention:

Fig. 1 is a view in side elevation of a mechanism which may be used in the practice of the method of this invention and which embodies the novel features of the mechanism;

Fig. 2 is a view taken upon line 2—2 of Fig. 1;

Fig. 3 is a fragmentary detail view of a clamping mechanism and scale quadrant moved out of normal position;

Fig. 4 is a detail sectional view taken upon line 4—4 of Fig. 1;

Fig. 5 is a fragmentary detail view on an enlarged scale of the pressure applying means showing its manner of engagement with a sample of the material to be tested, and Fig. 6 is a fragmentary view on an enlarged scale of the means for disengaging the driving means from the quadrant when a quick movement thereof is desired.

Referring to Fig. 1 of the drawings, 5 designates a base or supporting member upon which is mounted the frame of a balance beam scale comprising a lower horizontal member 6 connecting standards 7 and 8 and carrying a rack 9 adapted to be engaged by a pinion 10 controlled by a hand wheel 11 for moving the scale longitudinally on the supporting base 5 between guides 12—12 and 13—13, one each of which is shown on the drawing. At its upper end the standard 7 is provided with suitable supporting members 14—14 to receive knife edge supports 5—15 of a balance beam 16. At its opposite end the balance beam 16 extends through a slot 17 in the standard 8 which serves to limit its oscillating movement and is provided near its end with means for supporting a scale pan 18. A balance adjusting micrometer is indicated at 19. A beam slide for balancing the beam to fractions of the pan weights is indicated at 20. On its end adjacent the standard 7 the beam 16 is provided with a projection 21 upon which is supported upon knife edge bearings 22 a vertically extending rod 23 through the agency of which the amount of pressure applied to a test sample 25 for deflecting it through a given angle or arc is determined, as will hereinafter more fully appear.

Extending upwardly from the base member 5 is a supporting backing member 30 upon which is rotatably mounted a worm wheel 31, as more clearly shown in Figs. 2 and 4. Secured to rotate with the worm wheel 31 is a quadrant 32 upon which is mounted a scale bearing member 33 provided with a plurality of separately graduated scale indications 34—34, each being adapted to provide for the deflection reading of different lengths of samples. Mounted upon the quadrant 32 is a vise or clamping member comprising jaws 35 and 36 and a clamping screw 37. The worm wheel 31 is engaged by a worm 42 carried upon the end of a shaft 43 which is provided with a hand wheel 44, the turning of which swings the quadrant 32 around the pivotal support of the worm wheel 31. The outer end of the shaft 43 is supported in a horizontal position by means of an adjustable supporting member 45 with the inner end of the shaft ball shaped, as indicated at 46, and supported in a suitable socket formed in a bearing 47. This construction permits the disengagement of the worm 42 from the wheel 31, thereby providing for moving the quadrant 32 more rapidly than it can be moved by turning the hand wheel 44.

In the operation of this mechanism a test sample 25 of uniform cross section and given length is secured between the jaws 35 and 36 of the vise or clamping member in such a position that a punched depression 50 made in the sample will be engaged by the upper end of the pressure rod 23 which is provided with a pointed portion 51 for this purpose. The parts will then be adjusted so that the test sample 25 will lie in a horizontal position without pressure upon it. The hand wheel 44 will then be turned to move the quadrant 32 through a slight angle and the balance beam scale will be adjusted to balance and the amount of the pressure which is being exerted between it and the test sample 25 will be noted. Also the amount of deflection of the test sample will be noted and the two readings tabulated. The sample will then be moved backward to its zero position which may be done by disengaging the end of the rod 23 from it and the amount of permanent set, if any, of the test sample 25 will be noted on its corresponding scale. These readings will be repeated with gradually increasing amounts of pressure until the sample has been deflected considerably beyond the point where it first indicated a permanent set. For the best results the point of engagement of the pressure rod 23 with the test sample should be opposite one of the scales at the zero position upon the quadrant 32 and the readings as the sample is deflected should be taken at the point where the straight portion beyond the point of engagement of the test sample and the pressure rod crosses the adjacent scale.

The length of the sample used should be proportional to the thickness and the force should be applied in a direction perpendicular to a line connecting the point at which the pressure is applied and the edge of the clamp. The scales should be laid off in equal divisions of the circumference of a circle having a radius equal to the length of the sample and the deflection read at the point in the corresponding scale where the straight portion of the sample at or beyond the point of pressure crosses the graduated scale. The scale divisions will be in inches and fractions if weights are in pounds and in centimeters if weights are in kilograms. The length of the sample between points should be not more than 150 times the thickness.

With this method and apparatus, if the above conditions are observed, it is believed that the following formulæ will give results that are approximately correct for deflections that do not exceed 45 or 50 degrees:

E=Young's Modulus of Elasticity.
W=Pressure.
I=Moment of inertia.
S=Stress.
L=Length of sample from edge of clamp to point of application of pressure.
D=Deflection.
e=Elongation per unit length.
b=Width of rectangular sample.
d=Thickness of rectangular sample.

$$E = \frac{WL^3}{3DI}$$

$$E = \frac{4WL^3}{Dbd^3}$$

$$S = W\frac{3L}{bd^2}$$

$$e = D\frac{3d}{4L^2}$$

The maximum stress and elongation evidently occur near the clamp.

What is claimed is:

1. The method of testing the elastic properties of materials, which consists in fixing one end of a strip of material of uniform cross section and given length and deflecting said strip out of a normal plane by gradually increasing known amounts in response to pressures applied at the free end, noting the deflection pressures required and permanent set for each amount, and continuing the readings beyond the point where the sample first begins to show a permanent set.

2. The method of testing the elastic properties of materials, which consists in clamping one end of a strip of uniform cross section and given length, deflecting the strip by gradually increasing amounts by applying pressures to the strip at its free end and in a direction perpendicular to a line between the point of application of the pressure and the edge of the clamp, noting the deflection, determining the amount of pressure and permanent set for each amount of pressure, and continuing the readings beyond the point where the sample first begins to show a permanent set.

3. In an apparatus for testing the elastic properties of materials, means for holding a strip of the material to be tested, means for deflecting the material out of a normal plane, means associated with the holding means for indicating directly the amount of deflection, and means associated with the deflecting means for indicating directly the amount of deflecting pressure.

4. In an apparatus for testing the elastic properties of materials, clamping means for holding a strip of material to be tested, means adapted to engage a free end of the strip to cause it to be deflected out of a normal plane, means associated with the clamping means for indicating directly the amount of deflection, and means associated with the deflecting means for indicating directly the amount of deflecting pressure.

5. In an apparatus for testing the elastic properties of materials, a rotatable clamping means for holding one end of a strip of material to be tested, a quadrant movable with said clamping means, and provided with scales for designating the deflection of the strip, means for engaging the free end of the strip to cause it to be deflected upon movement of the clamping means, and a balance beam scale member for measuring the deflecting pressure.

6. In an apparatus for testing the elastic properties of materials, a rotatable clamping means for holding one end of a strip of the material to be tested, means adapted to engage the free end of the strip to cause its deflection out of a normal plane, a balance beam scale connected with said pressure means, and means for shifting said scale and pressure means longitudinally to compensate for variations in the length of the strip to be tested.

7. In an apparatus for testing the elastic properties of materials, means for holding a strip of the material to be tested, means for deflecting the material out of a normal plane, means associated with the holding means for indicating directly the amount of deflection, means associated with the deflecting means for indicating directly the amount of deflecting pressure, and means for compensating for variations in the lengths of the strips to be tested.

8. In an apparatus for testing the elastic properties of materials, means for holding a strip of the material to be tested, means for deflecting the material out of a normal plane, means associated with the holding means for indicating directly the amount of deflection, means associated with the deflecting means for indicating directly the amount of deflection, and means for adapting the indicating and deflecting means to compensate for variations in the lengths of the strips to be tested.

In witness whereof, I hereunto subscribe my name this twenty-seventh day of May A. D., 1920.

CHARLES W. ROBBINS.